US011479717B1

(12) United States Patent
Myllenbeck et al.

(10) Patent No.: US 11,479,717 B1
(45) Date of Patent: *Oct. 25, 2022

(54) HIGH LUMINESCENCE PLASTIC SCINTILLATORS

(71) Applicant: National Technology & Engineering Solutions of Sandia, LLC, Albuquerque, NM (US)

(72) Inventors: Nicholas Myllenbeck, Livermore, CA (US); Patrick L. Feng, Livermore, CA (US); Joseph Carlson, Castro Valley, CA (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 969 days.

This patent is subject to a terminal disclaimer.

(21) Appl. No.: 16/198,424

(22) Filed: Nov. 21, 2018

(51) Int. Cl.
*G01T 1/20* (2006.01)
*G01T 1/202* (2006.01)
*G01T 1/203* (2006.01)
*C09K 11/06* (2006.01)
*C09K 11/02* (2006.01)

(52) U.S. Cl.
CPC ............ *C09K 11/06* (2013.01); *C09K 11/025* (2013.01); *G01T 1/2033* (2013.01); *C09K 2211/1011* (2013.01); *C09K 2211/1014* (2013.01); *C09K 2211/1018* (2013.01)

(58) Field of Classification Search
CPC .................. C09K 11/06; C09K 11/025; C09K 2211/1007; C09K 2211/1011; C09K 2211/1018; C09K 2211/1014; C09K 2211/1033; G01T 1/2018; G01T 1/2033; G01T 1/2023
See application file for complete search history.

(56) References Cited

U.S. PATENT DOCUMENTS

| 3,698,086 | A | 10/1972 | Herr et al. |
|---|---|---|---|
| 7,064,228 | B1 | 6/2006 | Yu et al. |
| 9,274,237 | B2 | 3/2016 | Zaitseva et al. |
| 9,845,334 | B1 | 12/2017 | Feng et al. |
| 10,024,983 | B1 | 7/2018 | Feng et al. |
| 10,508,233 | B1 * | 12/2019 | Feng .................. G01T 1/20 |
| 2013/0299702 | A1 | 11/2013 | Zaitseva et al. |
| 2016/0178766 | A1 | 6/2016 | Sellinger et al. |
| 2016/0355729 | A1 * | 12/2016 | Pecinovsky ............... G01T 3/06 |

FOREIGN PATENT DOCUMENTS

| WO | 9940655 A1 | 8/1999 |
|---|---|---|
| WO | 2012142365 A2 | 10/2012 |

OTHER PUBLICATIONS

Yeh et al., "Polymers Derived from 3,6 Fluorene and Tetraphenylsilane Derivatives: Solution-Processable Host Materials for Green Phosphorescent OLEDs", 2008, Macromolecules, 41, pp. 3801-3807. (Year: 2008).*
Ponomarenko et al., "Nanostructured organosilicon luminophores and their application in highly efficient plastic scintillators", Oct. 8, 2014, Scientific Reports,4: 6549, pp. 1-8. (Year: 2014).*
Hemzawi, "Dyes and Pigments Containing Organosilicon Functional Groups", Journal of the Society of Dyers and Colourists, vol. 85, No. 3,pp. 401-404. (Year: 1969).*
Cai, et al., "Crystallization of Organic Glasses: Effects of Polymer Additives on Bulk and Surface Crystal Growth in Amorphous Nifedipine", In Pharmaceutical Research, vol. 28, Jun. 3, 2011, pp. 2458-2466.
Cha, et al., "New Spiro[benzotetraphene-fluorene] Derivatives: Synthesis and Application in Sky-Blue Fluorescent Host Materials", In Journal of Fluorescence, vol. 24, May 25, 2014, pp. 1215-1224.
Derose, Paul C., "Standard Guide to Fluorescence—Instrument Calibration and Validation", Oct. 2007, 27 pages.
Fang, et al., "New Random Copolymers with Pendant Carbazole Donor and 1,3,4-Oxadiazole Acceptor for High Performance Memory Device Applications", In Journal of Materials Chemistry, vol. 21, Aug. 4, 2010, pp. 4778-4786.
Huang, et al., "Synthesis and Characterization of Highly Stable and Efficient Star-Molecules", In Dyes and Pigments, vol. 96, 2013, pp. 705-713.
Kim, et al., "Blue OLEDs Utilizing Spiro[fluorene-7,9'-benzofluorene]-type Compounds as Hosts and Dopants", In Bull. Korean Chem. Soc., vol. 30, No. 3, Jan. 28, 2009, pp. 647-652.
Kucherak, et al., "Fluorene Analogues of Prodan with Superior Fluorescence Brightness and Solvatochromism", In The Journal of Physical Chemistry Letters, vol. 1, Jan. 12, 2010, pp. 616-620.
Powell, et al., "Fracture of Molecular Glasses Under Tension and Increasing Their Fracture Resistance With Polymer Additives", In Journal of Non-Crystalline Solids, vol. 429, 2015, pp. 122-128.
Salbeck, et al., "Spiro Linked Compounds for Use as Active Materials in Organic Light Emitting Diodes", In Macromolecular Symposia, vol. 125, 1997, pp. 121-132.
Wei, et al., "Properties of Fluorenyl Silanes in Organic Light Emitting Diodes", In Chemistry of Materials, vol. 22, 2010, pp. 1724-1731.
Wu, et al., "Synthesis of Amorphous Monomeric Glass Mixtures for Organic Electronic Applications", In Journal of Organic Chemistry, vol. 80, 2015, pp. 12740-12745.

* cited by examiner

Primary Examiner — Matthew E. Hoban
Assistant Examiner — Lynne Edmondson
(74) Attorney, Agent, or Firm — Samantha Updegraff; Medley, Behrens & Lewis, LLC

(57) ABSTRACT

A plastic scintillator includes a polymeric matrix comprising a primary fluorophore capable of forming an amorphous glass in its pure form. The primary fluorophore is also capable of generating luminescence in the presence of ionizing radiation and includes: a central species including silicon; a luminescent organic group bonded to the central species or to an optional organic linker group, the luminescent organic group including fluorene or an analog thereof; and the optional organic linker group, if present, is bonded to the central species and the luminescent organic group.

20 Claims, 1 Drawing Sheet

ately better PSD performance-commercial plastic...

HIGH LUMINESCENCE PLASTIC SCINTILLATORS

GOVERNMENT RIGHTS

This invention was made with Government support under Contract No. DE-NA0003525 awarded by the United States Department of Energy/National Nuclear Security Administration. The U.S. Government has certain rights in the invention.

FIELD

This disclosure relates to plastic materials that can be used as scintillators.

BACKGROUND

Scintillators are materials that emit flashes or pulses of light when they interact with ionizing radiation. Scintillator crystals are widely used in radiation detectors for gamma-rays, X-rays, cosmic rays, and particles characterized by an energy level of greater than about 1 keV. It is possible to make radiation detectors, by coupling the crystal (or scintillator) with an element for detecting the light produced by the crystal when it interacts, or "scintillates," when exposed to a source of radiation. The photo-detector produces an electrical signal proportional to the intensity of the scintillation (or light pulses received from the scintillator material). The electrical signal is then processed in various ways to provide data on the radiation.

Scintillators are incorporated into materials for radiation portal monitors and other radiation detection devices around the world. Gamma-ray spectroscopy is an important capability for radioactive isotope identification and is typically accomplished using inorganic scintillators or inorganic semiconductors. Recent advances have resulted in exceptional spectroscopic performance from both of these classes, yielding 662 keV energy resolution values of less than 3% for scintillator and less than 1% for semiconductors. However, high detector costs and low production yields remain as two significant shortcomings that prohibit their replacement of NaI(Tl) scintillators in large-scale applications.

Organic-based plastic and liquid scintillators have been proposed and investigated as an alternate paradigm that foregoes high-resolution gamma-ray spectroscopy in favor of high-efficiency detection. Plastic compounds provide a low-cost solution for large-volume scintillators but suffer from lower luminescence than less robust and more expensive glass scintillators. Organic scintillators also may be used for fast neutron detection due to the presence of hydrogen atoms in organic molecules. Hydrogen atoms undergo elastic scattering interactions with fast neutrons, which produce recoil protons that ionize the scintillator medium and produce light. Specific types of crystalline, liquid, plastic, and glass organic scintillators are capable of differentiating the light pulses produced by these fast protons from the fast electron light pulses produced by gamma-ray interactions. This method is known as Pulse Shape Discrimination (PSD) and is based upon an analysis of the relative ratio of prompt and delayed luminescence produced by each ionization event. PSD is easily disrupted by the presence of impurities, disorder, or a variety of other factors due to its dependence on Dexter energy transfer, which is a short-range intermolecular interaction. Organic glass scintillators and crystalline organic scintillators possess the highest PSD figure-of-merit values due to the combination of high scintillation light yields and efficient Dexter energy transfer. The PSD figure-of-merit is defined as the numerical value obtained by summing the full-width half maximum values of the respective gamma and neutron distributions, divided by the difference between the maxima obtained from the PSD histogram. While glass and crystalline organic scintillators provide substantially better PSD performance than plastic and liquid scintillators, they are more costly and generally limited to smaller volumes.

SUMMARY

As an improvement over current plastic scintillators, a silyl-fluorene based fluorophore is disclosed herein that is easily synthesized and cost-efficient and can be blended into a plastic scintillator. Improvements on the order of 30% enhancement in light output, relative to standard commercial plastic scintillator materials have been observed.

Disclosed herein is a plastic scintillator that is cost-efficient and scalable to large sizes. Embodiments of these scintillators exhibit PSD figure-of-merit values that are comparable to glass and crystalline organic scintillators.

A plastic scintillator includes a polymeric matrix and a primary fluorophore. The primary fluorophore is capable of generating luminescence in the presence of ionizing radiation and is capable of forming an amorphous glass in its pure form. The primary fluorophore includes: a central species including silicon; a luminescent organic group bonded to the central species or to an optional organic linker group, the luminescent organic group including a polycyclic aliphatic or polycyclic aromatic group or analogs thereof. The optional organic linker group, if present, is bonded to the central species and the luminescent organic group.

A method of making a plastic scintillator includes: dissolving a primary fluorophore in a monomer, then in-situ polymerizing the monomer via a radical addition mechanism or a condensation reaction. The primary fluorophore is capable of generating luminescence in the presence of ionizing radiation and is capable of forming an amorphous glass in its pure form. The primary fluorophore includes: a central species including silicon; a luminescent organic group bonded to the central species or to an optional organic linker group, the luminescent organic group including a polycyclic or polycyclic aromatic group or analog thereof. The optional organic linker group, if present, is bonded to the central species and the luminescent organic group.

A method of making a scintillator includes blending a polymer and a primary fluorophore with one or more of mechanical mixing, heating, or co-dissolution in a solvent to form a blended material; and thermally processing the plastic scintillator into a desired shape. The primary fluorophore is capable of generating luminescence in the presence of ionizing radiation and is capable of forming an amorphous glass in its pure form and includes: a central species including silicon; a luminescent organic group bonded to the central species or to an optional organic linker group, the luminescent organic group including a polycyclic or polycyclic aromatic group or analog thereof. The optional organic linker group, if present, is bonded to the central species and the luminescent organic group.

BRIEF DESCRIPTION OF THE DRAWING

The FIGURE shows photos of several examples and comparisons to standards.

DETAILED DESCRIPTION

Various technologies pertaining to scintillator materials are described herein. In the following description, for purposes of explanation, numerous specific details are set forth in order to provide a thorough understanding of one or more aspects. It may be evident, however, that such aspect(s) may be practiced without these specific details. Except when the context clearly indicates the contrary, the term "polymer" is meant to also encompass copolymers.

In embodiments disclosed herein, the incorporation of new types of fluorophores into plastic-based scintillators has resulted in materials which give a much stronger signal (more light output) from radiation exposure than current commercially available plastics. The increase in performance of these materials will improve the detection capability of these devices. In particular, silyl fluorene fluorophores are added, and these provide high oxidative stability, chemical robustness, high scintillation light yield, and resistance to crystallization. In embodiments, incorporating such silyl fluorophores into plastics also improves their durability and/or strength.

The plastic scintillator disclosed herein includes a polymer matrix comprising an aromatic or aliphatic polymer. A fluorene-containing fluorophore is included either before polymerization, or physically (e.g., with mechanical methods, heating, or both) blended with powdered polymer via high temperature extrusion or casting. The fluorene-containing fluorophore is capable of forming an amorphous glass in its pure form and is capable of generating luminescence in the presence of ionizing radiation. In an embodiment, the scintillator may function as a hybrid plastic and glass scintillator. The polymer may be formed by a radical addition mechanism or a condensation reaction. In embodiments, additional additives are provided.

The plastic scintillator includes an aromatic or aliphatic polymer matrix. In an embodiment, the polymeric matrix includes a polymer with polymerized aromatic-group containing monomer units, such as styrene or vinyltoluene, or mixtures thereof. For example, the aromatic polymeric matrix may comprise poly(styrene), poly(vinyltoluene), or mixtures thereof. In an embodiment, the aromatic polymeric matrix further includes a polymer containing polymerized vinyl-group containing monomer units, a polymer containing polymerized acrylate-group containing monomer units, a copolymer containing one or more of polymerized vinyl-group containing monomer units, polymerized acrylate-group containing monomer units, and polymerized aromatic-group containing monomer units, or a combination thereof. A polymer containing one or more carbonate groups may be used.

In an embodiment, co-polymers of multiple vinyl-group monomers may be used in the polymeric matrix. Copolymers of vinyl-group monomers with other monomers may also be used. In an embodiment, polymers may be selected, for example, from the group consisting of polystyrene ("PS"), polyvinyltoluene ("PVT", including isomers thereof), poly(9-vinylcarbazole), poly(ethylene terephthalate) (PETE), bisphenol A polycarbonate ("polycarbonate"), or combinations thereof. In an embodiment, a combination of an aromatic vinyl group-derived polymer and a methacrylate-derived polymer is used. The vinyl group-derived polymer and methacrylate-derived polymer combination may, for example, be present in a weight ratio of 0.01 to 100 (vinyl-group derived polymer): 100 to 0.01 (methacrylate group-derived polymer), such as, for example, 0.1 to 10: 10 to 0.1, or 0.5 to 1 to 1 to 0.5. Other copolymers may comprise different monomer units with the same ratios.

In an embodiment the polymer is partially aliphatic and comprises monomers including methacrylate, acrylate, or carbonate functional groups. Examples include: poly(methyl methacrylate), poly(methyl acrylate), bisphenol-A-polycarbonate. These may be homopolymer or copolymers with other monomers.

In an embodiment, the plastic polymer may, for example, have a weight average molecular (Mw) weight ranging from 40,000 to 1,000,000, such as 100,000 to 700,000, or 150,000 to 500,000. The plastic polymer may, for example, have a number-average molecular weight (Mn) of 20,000 to 900,000, 50,000 to 500,000, or 100,000 to 300,000. The plastic polymer may, for example, have a Mw/Mn of 1.01 to 5, such as 1.2 to 4, or 1.3 to 3. In an embodiment, the plastic polymer may have glass transition temperature ($T_g$) of 40 to 150° C. For example, in an embodiment for gamma-ray spectroscopy only, $T_g$ values in the range of 70 to 160° C. are expected. In an embodiment with compositions that provide gamma-ray spectroscopy and neutron/gamma pulse-shape discrimination, $T_g$ values in the range of 40 to 80° C. are anticipated, owing to the higher concentration of primary fluorophore (up to 30% by weight of the total composition). In an embodiment with samples that are cross-linked, such as by using greater than 3% (such as, up to 10%) by weight of the total composition of a vinyl- or methacrylate-based cross-linker, $T_g$ values of up to 165° C. are possible.

The plastic polymer should have high transparency, such as, for example, 75% to 100% light transmittance, such as 80% to 85%, 90% to 98%, or 92% to 97%. Test conditions from ASTM D1003-13 may be used to determine light transmittance.

In an embodiment, the plastic scintillators described herein include a primary luminescent organic compound (also referred to herein as a primary fluorophore) in the concentration range of 50% or less by weight of the total composition, such as 0.5-49%, for example, 0.8 to 30%, or 1 to 15%. The primary method for incorporating such quantities of the primary luminescent organic compound is the in situ polymerization method disclosed below.

In another embodiment, the scintillators described herein include a primary luminescent organic compound (also referred to herein as a primary fluorophore) in the concentration range of 0.5-99.9% by weight of the total composition, such as, for example, 50% to 99%, or 60 to 90%. The primary method for incorporating quantities over 40% of the primary luminescent organic compound is the post-polymerization blending method disclosed below. Scintillators disclosed herein with amounts of primary fluorophore exceeding that of the plastic polymer, may be described as a plastic-glass hybrid scintillator, but in a broader sense are also plastic scintillators.

The primary luminescent organic compound is a silyl-fluorene compound. It is known that the dissipation of stresses in low-symmetry crystalline scintillators, such as trans-stilbene, results in brittle fracture and is a typical failure mode due to an insufficient number of independent slip systems to dissipate an applied stress. A silyl fluorene scintillator was engineered possessing a spatial configuration that can form a room temperature stable organic glass scintillator by resisting crystallization. The benefits from this include the ability to dissipate stress as well as solubility into a polymer matrix.

Through various experiments on silyl-fluorene compounds with additional functional groups, it was discovered that certain fluorene compounds were excellent candidates for scintillating fluorophores. Despite emitting in the 420 nm region, fluorene and its derivatives have not been widely explored in the context of scintillators. Fluorene possesses an advantage in that it can be readily derivatized at the benzylic position to provide oxidative stability, enable facile modification of properties, and resist crystallization.

Silyl fluorene compounds that can be used as the primary luminescent organic compound are shown below:

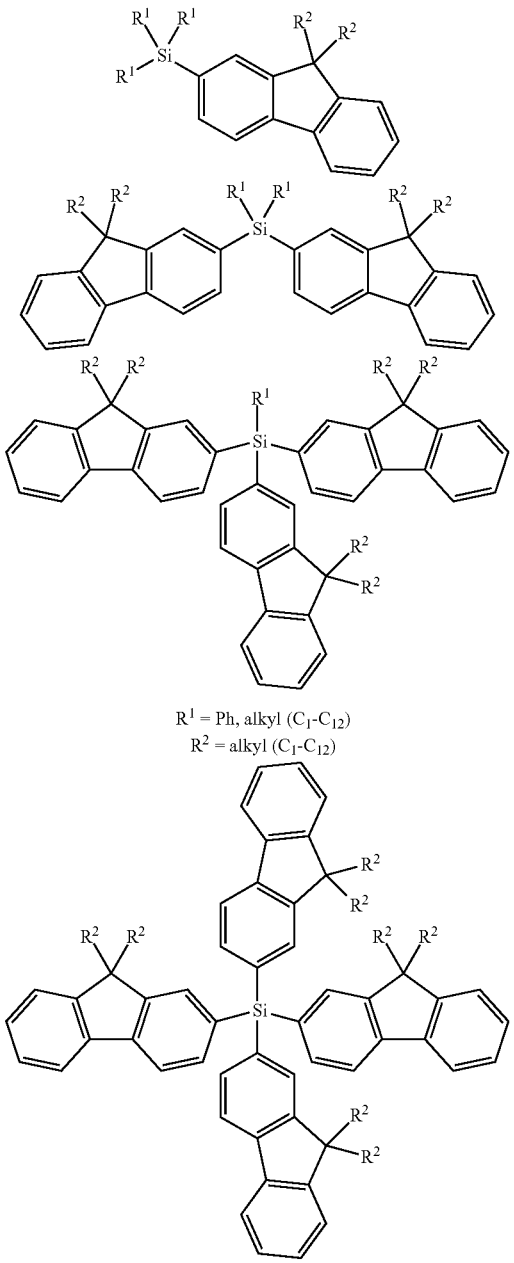

$R^1$ = Ph, alkyl ($C_1$-$C_{12}$)
$R^2$ = alkyl ($C_1$-$C_{12}$)

In addition, the fluorene moiety is not necessarily a constraining factor to reaching the improved scintillating material, but rather other types of materials could also be used. It is believed that the following factors contribute to selection of other fluorophore compounds that are suitable for to obtain the improved plastic scintillator.

In an embodiment, the silyl-fluorene compound forms a glass compound of at least moderate stability on its own. That is, the compound does not visibly cloud due to recrystallization within two weeks from casting.

The role of the luminescent silyl-fluorene compound is to provide a light emission response to ionizing radiation (scintillation) and secondarily to improve the physical properties (material stability, mechanical toughness, among others).

In an embodiment, more than one silyl-fluorene compound may be used to compose the primary fluorophore of the compound, and the additional compound may be mixed in a ratio of 90%:10% to 10%:90% with the first silyl fluorene compound, such as 70%:30% to 30%:70%, or 55%:45% to 45%:55% by weight.

The class of symmetric silyl-fluorene fluorophore material includes a central Si atom and one or more luminescent organic groups bonded to atom. In one embodiment, luminescent groups are bonded in a configuration as to disrupt pi-pi stacking and increase solubility, and thereby allowing facile incorporation into a polymer matrix. In another embodiment, or in combination with the embodiment above, steric bulk can be introduced on or near the luminescent groups to disrupt pi-pi stacking. In another embodiment or in a combination with the embodiment above, the benzylic carbons of the ligands are modified.

The organic groups that are bonded to the central Si atom are luminescent. Organic generally means the elements of life, and encompasses carbon-containing compounds and may also include oxygen, nitrogen, sulfur, phosphorous, halogens, and alkali metals. In an embodiment, the luminescent organic group comprises an aromatic species that is a chromophore. In an embodiment, the luminescent organic group is a polycyclic or polycyclic aromatic group.

In an embodiment, the luminescent organic group comprises, for example, fluorophores selected from, spirobifluorene, fluorene, carbazole, naphthalene, biphenyl, and analogs thereof. In another embodiment, the luminescent organic group comprises, for example, fluorophores selected from terphenyl, trans-stilbene, naphthalene, anthracene, truxene, triphenylene, 1,3,5-triphenylbenzene, coumarin, anthracene, coumarin, phenyloxazole, phenyloxadiazole and analogs thereof. Analogs thereof may, for example, include substitutions of hydrogen atoms or units of unsaturation with alkyl, aryl, heterocycles, halogens, or heteroatoms of type $BR_2$, $B(OR)_2$, $NR_2$, OR where R is alkyl or aryl. Substitutions may occur at the benzylic carbon position. In certain embodiments, the luminescent organic groups are selected from functionalized organic chromophores that intrinsically behave as a scintillator. These compounds may include, for example, compounds such as: (C3-symmetric examples): truxene, triphenylene, 1,3,5-triphenylbenzene, and analogs thereof; and (non-C3-symmetric examples): Spirobifluorene, fluorene, carbazole, coumarin, anthracene, naphthalene, biphenyl, coumarin, phenyloxazole, phenyloxadiazole and analogs thereof. The term "analogs thereof" is defined as above. The aryl groups may, for example, have five to twenty carbon atoms in the ring structure.

These examples typically are chemically modified (e.g., derivatized) to prevent spontaneous recrystallization upon cooling. Effective strategies to this end include the incorporation of linear or branched alkyl groups, or heteroatoms of type $BR_2$, $B(OR)_2$, $NR_2$, OR where R is alkyl or aryl. In an embodiment, the alkyl groups, aryl groups, or R groups may, for example, have 1 to 20, 5 to 18, or 6 to 16 carbon atoms.

Additional examples of fluorophore groups that may be attached to symmetric organic central moieties may comprise a wide range of known scintillating molecules, including, but not limited to: the structures (I) to (IX) below, 2,5-diphenyloxazole, 9,9'-dialkylfluorene, 9,9'-diarylfluorene, aryl-and/or alkyl substituted diarylfluorene such as is shown in structure I below (in particular, 2-aryl-9,9'-dialkylfluorene, 2-aryl-9,9'-dialkylfluorene) 7-aryl-9,9'-dialkylfluorene, 7-aryl-9,9'-diarylfluorene, 7-alkyl-9,9'-dialkylfluorene, 7-alkyl-9,9'-diarylfluorene, 9,10-diphenylanthracene, 2,5-diphenyl-1,3,4-oxadiazole, p-terphenyl, salicylic acid, and methyl salicylate, and analogs thereof (as defined above).

In particular embodiments, the luminescent organic compound is selected from the group consisting of one or more silyl-fluorene based molecules functionalized one or more times at one or more of the 2-, 7-, or 9-positions. For example, the silyl group may be attached to the 2-position of each fluorene molecule and the other functional groups are attached at other locations and selected from the group of aliphatic alkanes or alkenes, aromatic hydrocarbons, methoxy, hydroxy, amine, alkylamine, phenylamine and analogs thereof. Alkyl chains in any of these groups may have, for example, 1 to 20, 5 to 18, or 6 to 16 carbon atoms.

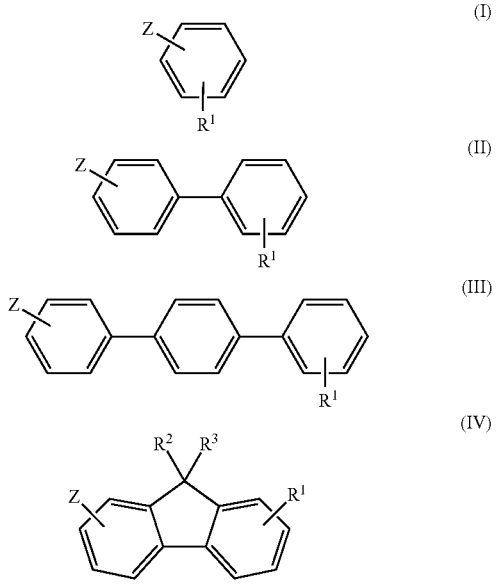

In structure (I) to (IV) Z is the central atom or species, Si. $R^1$ is H, alkyl, alkoxy, aryl, aryloxy, B(aryl)$_2$, B(alkoxy)$_2$, or N(alkyl)$_2$. The alkyl, alkoxy, aryl, and aryloxy groups may contain 1 to 20, 5 to 18, or 6 to 16 carbon atoms. $R^2$ and $R^3$ may be independently selected from alkyl groups, F, and oxygen. The hovering bond of Z and $R^1$ denotes that substitution can be at any point on the ring.

In an embodiment, each luminescent organic group may have a number average molecular weight of 100 to 2,500 Dalton (g/mol), such as 300 to 1200 Dalton, or 500 to 1000 Dalton.

In an embodiment, the luminescent organic group comprises a polycyclic group comprising one or more benzylic carbons and at least one benzylic carbon is substituted with an organic group. In an embodiment, the benzylic carbon that is substituted is a doubly benzylic carbon. The organic group may be an alkyl group, for example, a linear 1 to 6, branched, cyclic, or aromatic group, having 1 to 20 carbon atoms, such as 4 to 15, or 5 to 8 carbon atoms. As explained further below the organic group on the one or more benzylic carbons should be selected to inhibit pi-pi stacking in the compound.

In an embodiment, the luminescent organic group is selected from the group consisting of: phenyl, biphenyl, terphenyl fluorene, 9,9'-dialkylfluorene, 9,9'-diarylfluorene, 9,9'-dibenzylfluorene, and analogs thereof.

In an embodiment, the luminescent organic group is selected from the group consisting of: quaterphenyl, terphenyl, trans-stilbene, naphthalene, anthracene, truxene, triphenylene, 1,3,5-triphenylbenzene, spirobifluorene, fluorene, carbazole, coumarin, anthracene, naphthalene, biphenyl, coumarin, phenyloxazole, phenyloxadiazole, 2,5-diphenyloxazole, 9,9'-dialkylfluorene, 9,9'-diarylfluorene, 2-aryl-9,9'-dialkylfluorene, 2-aryl-9,9'-diarylfluorene, 7-aryl-9,9'-dialkylfluorene, 7-aryl-9,9'-diarylfluorene, 7-alkyl-9,9'-dialkylfluorene, 7-alkyl-9,9'-diarylfluorene, 9,10-diphenylanthracene, 2,5-diphenyl-1,3,4-oxadiazole, p-terphenyl, salicylic acid, and methyl salicylate and analogs thereof In an embodiment, there is a linker atom or group between the central atom/moiety and the fluorophore. The linker group can be a linear or branched alkyl, aryl, heteroaryl, heteroalkyl group (such as ether), or combinations thereof. The linker group is an optional component of the compound. Representative examples are depicted in structure (V) to (VII), where the linker is L. R$_3$Si—L-R, where L=

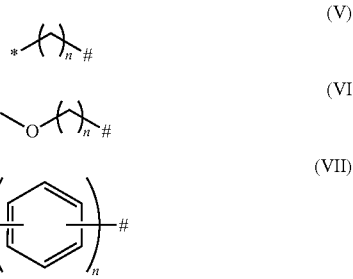

wherein n=1-5, and R is a fluorescent organic group. * and # represent attachment points to SiR$_3$ and R, respectively.

Additional examples of silicon-centered compounds include those represented by formula VIII:

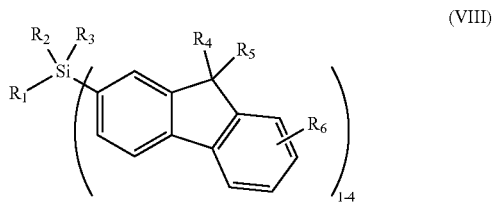

The R groups (R$_1$ to R$_6$) in formula VIII may be independently selected alkyl or aryl groups, for example, linear, branched, cyclic, or aromatic groups, each having 1 to 24 carbon atoms, such as 4 to 15, or 5 to 8 carbon atoms. The R groups may be the same or different. In an embodiment, one or more of R$_1$, R$_2$, or R$_3$ are not present, in this case the subscript on the fluorene group may range from 2-4. Formula VIII also includes diastereomers and enantiomers, where the fluorene moiety or the alkyl groups are stereocenters. Formulae IX and X are further examples of such.

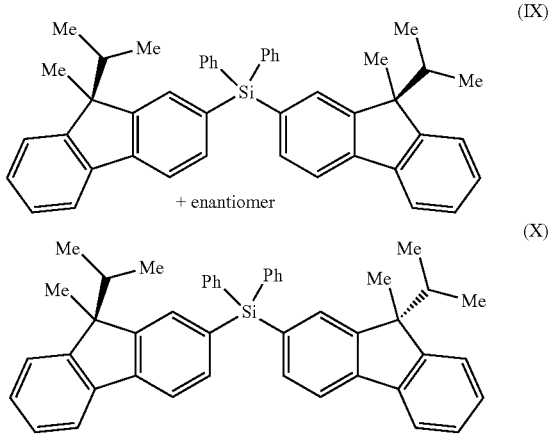

(IX)

(X)

Formula X represents a mixture of diastereomers with the fluorene moiety as the stereocenter.

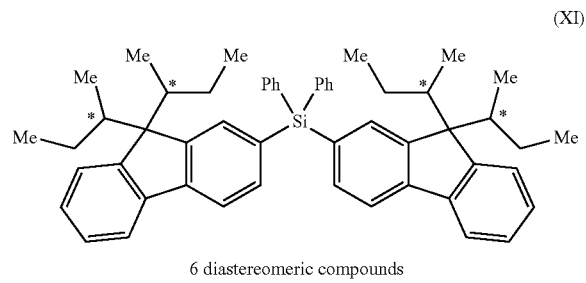

(XI)

6 diastereomeric compounds

Formula XI represents six diastereomeric compounds with the substituent alkyl groups as the stereocenters.

Two general methods have been used to obtain organic fluorophores that form glassy states in their pure form: (1) design of an overall three-dimensional structure that prevents efficient pi-pi stacking interaction, which can include luminescent organic groups arranged in a tetrahedral or spirocyclic configuration; and (2) the presence of bulky functional groups either directly attached, or two to three bonds away from the luminescent organic group that prevents efficient pi-pi stacking interaction. This selection criteria can produce compounds amenable to forming a stable glassy state despite the native fluorophore not able to form a stable glassy state.

More particularly, techniques or predictors disclosed herein found to affect the compound's ability for high scintillation and to resist crystallization are (a) selecting luminescent groups that have high quantum yields, and (b) selecting a central atom or species with a particular bond length and angle with the luminescent groups (e.g., tetrahedral or tripodal geometries), and (c) choosing appropriate functionality on the non-aromatic portion of the molecule to inhibit aromatic stacking.

The central atom and luminescent organic groups should be selected to result in stable organic glasses. The luminescent organic group can be added through symmetry modification of the compound (i.e. C3 rotational symmetry element) or the chemical functionalization of the compound to confer resistance to crystallization upon cooling (i.e. addition of aliphatic, alkoxy-, or other functional groups).

The selection of the luminescent organic group also has implications for the electronic properties of the fluorophore, particularly with respect to the electron and hole mobilities. These properties are important for neutron/gamma pulse-shape discrimination (PSD), which is a widely used technique for the detection of special nuclear materials.

In an embodiment, the central atom or moiety and the luminescent organic groups are selected to produce a compound with as high a glass transition temperature ($T_g$) as possible. Embodiments with higher $T_g$s produce less transient effects and are typically more stable. In another embodiment, the central atom or moiety and the luminescent organic groups may have a low $T_g$. At or above the $T_g$, crystallization may occur, but the radioluminescent properties may improve as well. Compact luminescent groups typically predict a higher $T_g$ and form a molecular structure with a roughly spherical shape.

In an embodiment, the organic luminescent compound has a trigonal pyramidal or tetrahedral structure that is tripodal with the luminescent organic group substitutions, i.e., three substitutions with luminescent organic groups and optionally has a fourth organic substituted group (not necessarily a luminescent group).

It is also possible to modify the glass-forming properties of the fluorophore by controlled substitution of the different positions of the molecule. For silyl-based compounds it was discovered that a less bulky group, such as, for example, a linear hydrocarbon, at the axial silicon site leads to glasses that are more resistant towards crystallization, whereas bulky hydrocarbons tend to possess higher $T_g$ values but also have the potential to recrystallize over time. Modification of the benzylic carbon in the case of the fluorene-based fluorophores, leads to profound changes in thermal properties. A change from gem-dimethylfluorene to gem-dipropylfluorene (gem as known to those of skill in the art means "geminal," and indicates a relationship of two groups attached to the same carbon) groups results in a decrease in $T_g$ from 93° C. to 55° C. Separately, insertion of a benzene group between the silicon atom and the 2-fluorene position of the ligands has been shown to increase the $T_g$ to 130° C., while retaining the intrinsic amorphous properties of the material.

The geometry of the fluorophore can also be manipulated to resist aromatic stacking by partial substitution of the central atom, for example, compounds that are based on a central atom or species that has only been di-substituted with the fluorescent groups. While this has been shown to result in generally lower glass transition temperatures than the tri- and tetra-substituted analogs, this method is an alternate route to prepare the fluorophore.

In a class of organic glass materials, the luminescent organic groups are not identical to each other, and the different luminescent organic groups may or may not undergo intramolecular energy transfer between them. The potential advantages of this approach are to increase the scintillation light yield, further improve the glass-formation properties, and/or shift the emission wavelength into a longer wavelength region for better compatibility with the employed photodetector.

In an embodiment, the organic luminescent compound may be selected from those disclosed above, where the mixture is of non-identical stereoisomers.

In an embodiment a mixture of organic luminescent compounds may include one, two, or more than two compounds from those disclosed above. In an embodiment, the mixture of organic compounds may include one, two, or more than two organic components with non-identical groups, such as those disclosed above.

In an embodiment, a mixed organic luminescent fluorophore compound includes a first compound and a second compound that together form a glass. The first compound has a $T_g$ greater than 25° C., is organic, and is capable of generating luminescence in the presence of ionizing radiation. The first compound includes a central silicon species and a luminescent organic group bonded to the silicon central species or to an optional organic linker group. The optional organic linker group, if present, is bonded to the silicon atom and the luminescent organic group.

The second compound also has a $T_g$ greater than 25° C. and includes a central silicon species and a luminescent organic group bonded to the silicon central species or to an optional organic linker group. The optional organic linker group, if present, is bonded to the silicon atom and the luminescent organic group. In an embodiment, the first and second compounds are enantiomers or diastereomers.

In an embodiment, the scintillating compositions described herein also contain a secondary fluorophore in the concentration range of 0.01 to 0.5% by weight of the total composition, such as, for example, 0.05 to 0.2%, or 0.8 to 0.15%. A wavelength shifter improves light yield by increasing the Stokes shift, so as to reduce self-absorption in the material (compared to the undoped material).

In an embodiment, the secondary fluorophore may be a wavelength-shifting fluorophore and may be selected from: 1,4-bis(5-phenyl-2-oxazolyl)benzene (POPOP), 2,5-Bis(5-tert-butyl-benzoxazol-2-yl)thiophene (BBOT), 1,4-bis(9,9'-dialkylfluorene) benzene, or 1,4-(9,9'-dialklyfluorene) biphenyl 1,4-bis(2-methylstyrl)benzene (bis-MSB), 9,10-diphenylanthracene, 2-(1-naphthyl)-5-phenyloxazole (NPO), or pi-conjugated fluorene-based fluorophores comprising 2,2'-bis(9,9'dialkylfluorene), derivatives of these, or combinations of these. Other wavelength shifters known to those of skill in the art may also be added to the composition.

Triplet harvesting dopants such as bis[2-(4,6-difluorophenyl)pyridinato-C2,N](picolinato) iridium (III) (FIRPic) may also be used.

In an embodiment, homogenous incorporation of the wavelength shifter into the compound is done prior to the polymerization process, as they are dissolved in solution with monomers.

In an embodiment, the scintillator disclosed herein includes an anti-fog additive that resists the development of hydrothermally-induced aging defects (e.g. discoloration and "fogging"). Such defects scatter light and reduce the scintillation light output in large pieces. In some exemplary embodiments, the formulations can be scaled to large sizes (e.g. 200 g), facilitating simple transfer to commercial production companies. The anti-fog additive can significantly increase the solubility of water in the matrix, thus preventing phase-separation or 'fog' formation between 55° C. and −55° C. while maintaining nominal radioluminescence light output. The anti-fog agent can be either an additive that is dispersed in the aromatic polymeric matrix or a comonomer incorporated into the polymer itself.

In an embodiment, the anti-fog agent includes a cyclic central group, which can be aromatic, hetero-aromatic, aliphatic or hetero-aliphatic; an oxygen-containing functional group; and an optional linking group selected from: a $C_1$ to $C_{20}$ alkyl group or poly(ethylene glycol). If the optional linking group is not present, the cyclic central group is bonded directly to the oxygen-containing functional group; and if the optional linking group is present, the cyclic central group is bonded to the optional linking group, and the oxygen-containing functional group is also bonded to the optional linking group. In an embodiment, the oxygen-containing functional group and the aromatic group are bonded to opposite terminal ends of the linking group. In an embodiment, the anti-fog agent includes an aromatic group, an alkyl chain of at least 2 carbon atoms bonded to the aromatic group, and an oxygen-containing functional group bonded to the alkyl chain or aromatic group. In an embodiment, the aromatic group is a benzene group that may or may not include additional substitutions other than those required for the linking group and/or oxygen-containing functional group, such as aryl alcohol or aromatic polyol. In an embodiment, the heteroatomic group includes a nitrogen atom in the ring, and, for example, may be substituted or unsubstituted pyridine. In an embodiment, the oxygen-containing functional group is an alcohol, a carboxylic acid, an ethylene oxide or polyethylene oxide, or combinations thereof. A combination thereof includes, for example, a polyethylene oxide group bonded to the aromatic group and terminating in a hydroxide group. The alkyl chain may be linear, branched, or cyclic, and include, for example, 2 to 30 carbon atoms, such as 3 to 10, or 5 to 9. The term "group" is meant to encompass groups optionally with additional substituents, such as, an aromatic group can include a benzene ring group with an alkyl chain substituent.

In an embodiment, the anti-fog agent is selected from the following classes of compounds:
 an aryl alcohol or aromatic polyol;
 a cyclic, non-aromatic alcohol or polyol thereof;
 a non-ionic surfactant;
 a carboxylic acid (aryl or cyclic, non-aromatic); or
 an amine (aryl or cyclic, non-aromatic).

In an embodiment, the anti-fog agent is a nonionic surfactant. In an example of the nonionic surfactant, the linking group is present and comprises a hydrophilic polyethylene glycol chain, and the aromatic group comprises an aromatic hydrocarbon lipophilic or hydrophobic group. An example, of such are those sold under the TRITON name and include derivatives of 4-tert-octylphenoxy-oligoethyleneglycol, with a variable ethylene glycol chain length. The ethylene glycol group may, for example, have n repeating ethylene glycol units, where n is 4 to 30, such as 5 to 10, or 6 to 8. In such an embodiment, the polyethylene oxide group may be bonded to a terminal hydroxyl group. For example, the nonionic surfactant may be TRITON X-100, TRITON X-114, TRITON X-45, TRITON N, and TRITON X. The nonionic surfactant may be present in an amount of 0.5 to 5% by weight, such as 1 to 4%, or 2 to 3% by weight. The nonionic surfactant can function well as an anti-fog agent without a cross-linking agent, and sequesters a high mass of water, relative to the plastic matrix.

The anti-fog agent has a relatively low molecular weight, such as a number average molecular weight of 100 to 1000 g/mol, 115 to 750 g/mol, or 125 to 550 g/mol. In an embodiment, the anti-fog agent is one or more species selected from formulas XII-XIV.

XII

XIII

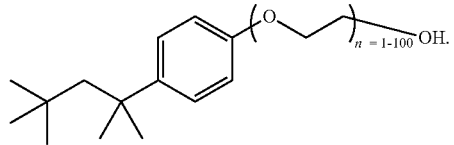

XIV

The species represented by formula XII-XIV are known respectively as 3-phenyl-1-propanol (3P1P), (1,1,3,3-tetramethylbutyl)phenyl-polyethylene glycol (TRITON X family), and hydrocinnamic acid. In an embodiment, the alkyl chains of these species can be varied by 1 to 15 carbons (with associated hydrogens), and the value of n can vary from 1 to 100, such as 5 to 75, or 40 to 60.

The anti-fog agent used as an additive to the plastic matrix, may also be selected from, benzyl alcohol, 2-phenylethan-1-ol, 3-phenylpropan-1-ol, 1,2-phenylenedimethanol, pyridine, 2-phenoxy-1-ethanol, phenylacetic acid, or combinations thereof. In an embodiment, the anti-fog agent does not plasticize the plastic scintillator.

In an embodiment, the anti-fog agent may be a comonomer incorporated into the plastic polymer of the polymeric matrix. A copolymer of an aromatic monomer (e.g. styrene) and an anti-fog comonomer may be used to achieve a lower vapor pressure relative to the non-polymerizable anti-fog compounds. Some comonomers may also provide improved optical quality through improved solubility/miscibility of the anti-fog agent and/or fluorophore within the copolymer matrix.

In an embodiment, the comonomer anti-fog agent is a free-radical copolymerizable monomer, and may be selected from the group consisting of: a vinyl pyrrolidone monomer, a monomer comprising an acrylate group, a monomer comprising an alcohol group, or a combination thereof. In an embodiment, the comonomer anti-fog agent is selected from the group consisting of: benzyl methacrylate, 4-vinylbenzyl alcohol, or N-vinylpyrrolidone. Comonomers may be employed in an amount of 0.1 to 30% by weight of the copolymer, such as 1% to 20%, or 3% to 8%.

Plasticizers may be present in the plastic scintillators, which may change the thermal and mechanical properties of the material. In other embodiments, plasticizers may comprise an organic molecule such as 2,5-diphenyloxazole (PPO), which is recommended for plastics that exhibit gamma-ray spectroscopy and neutron/gamma PSD capabilities. Plasticizers may be used in conjunction with the cross-linking agents described above to modify the thermal and mechanical properties to meet application requirements. In general, plasticizers increase the free volume in the polymer and decrease the glass-transition temperature, whereas cross-linkers decrease the free volume in the polymer and increase the glass-transition temperature. Fluorescent quenching additives may be added to the glass to shorten the scintillation decay time for fast timing applications. These quenchers are known to those skilled in the art and may comprise compounds belonging to the following general classes: heavy-atom (organometallic or organohalide), low-lying triplet (benzophenone, other aromatic carbonyls, etc.), and charge-transfer (cyano, nitro, amine) quenching compounds. In an embodiment, these non-luminescent additives are incorporated into the plastic matrix in a weight percentage of 0.01% to 10%, such as 0.03% to 6%, or 0.05% to 1% by weight. In particular, for triplet harvesting dopants, such as iridium-based dopants effective amounts may be present in amounts of 0.01 to 3%, such as 0.1% to 1%, or even as low as 0.03% to 0.3%, such as 0.04% to 0.2%, or 0.05% to 0.15%.

The scintillator compositions described herein may contain between 1-40%, such as 5% to 30%, or 7.5% to 20% by weight of the organometallic complex. The metal atom may be present in an amount of 1 to 20%, such as 5% to 10%, or 6% to 9% by weight of the total weight of the scintillator composition.

An organometallic compound such as metalloalkyl compounds, alkylmetallomethacrylates, alkylmetalloacrylates, metallomethacrylates, alkylmetallostyrenes, metalloacrylates, and metallostyrenes may be used in the polymer matrix. The following exemplary classes of compounds may be used in the polymer matrix.

a. Aliphatic organometallic compounds with the formula $(R_1)_x(R_2)_{n-x}M$, where $R_1$ and $R_2$ correspond to linear or branched alkyl substituents, and n and x are integers between 0 and 4, with n≥x. Representative examples of $R_1$ and $R_2$ include but are not limited to methyl, ethyl, propyl, butyl, isopropyl, or tert-butyl. In a particular embodiment, carboxylate groups may be used as $R_1$ and/or $R_2$. In an embodiment, the identity of the metal center M in the organometallic compound may comprise the following Group 13, 14, or Group 15 atoms: Ge, In, Sn, Sb Pb, or Bi.

b. Aromatic-containing organometallic compounds with the formula $(R_1)_x(R_2)_{n-x}M$, where M is a heavy metal, and $R_1$ and $R_2$ correspond to aromatic-based substituents, and n and x are integers between 0 and 4, with n≥x. Representative examples of $R_1$ and $R_2$ include but are not limited to phenyl, benzyl, phenylethyl, phenylpropyl, naphthyl, methylnaphthyl, styryl, or methylstyryl. In an embodiment, the identity of the metal center M in the organometallic compound may comprise the following Group 13, 14 or Group 15 atoms: Ge, In, Sn, Sb, Pb, or Bi.

c. Mixed aliphatic and aromatic-containing organometallic compounds with the formula $(R_1)_x(R_2)_{4-x}M$, where M is a heavy metal, $R_1$ and $R_2$ correspond to either of the aliphatic or aromatic substituents described in items a and b above, and n and x are integers between 0 and 4, with n≥x. In an embodiment, the identity of the metal center M in the organometallic compound comprises the following Group 13, 14, or Group 15 atoms: Ge, In, Sn, Sb, Pb, or Bi.

d. Polymerizable aliphatic or aromatic-containing organometallic compounds with the formula $(R_1)_x(R_2)_{4-x}M$, where M is a heavy metal, $R_1$ corresponds to the aliphatic or aromatic-containing substituents described in sections b and c above and $R_2$ corresponds to a polymerizable group such as styryl, methylstyryl, acrylate, methacrylate, vinyl methacrylate, and n and x are integers between 0 and 4, with n≥x In an embodiment, the identity of the metal center M in the organometallic compound comprises the following Group 13, 14, or Group 15 atoms: Ge, In, Sn, Sb, Pb, or Bi.

In an embodiment, the scintillating material further comprises a thermal neutron detector additive, such as a $^{10}$B-compound or $^6$Li compound. Thermal neutrons can be detected from their reaction with the nucleus of $^{10}$B or $^6$Li and measuring the scintillation light produced by the alpha particles released by this reaction.

The $^{10}$B compound may include a group selected from the group consisting of: carboranes, boronic acids, boronic esters, boronic pinacol esters, or boranes, as disclosed in U.S. 2016/0178766A1 or U.S. 2016/0355729A1, each of which are incorporated herein by reference. An example borane is $C_{12}H_{24}B_2O_4$. The borane compound may be a boronic ester having the formula $B(OR)_3$ wherein R is selected from the group consisting of ethanol, methanol, propanol, butanol, benzyl alcohol, phenol, pyrocatechol, ethylene glycol, and propylene glycol.

The $^6$Li-containing compound may be a salt of an aliphatic or aromatic acid, lithium benzoate, or Li-oxazolecarboxylates. Such as those disclosed in U.S. Pat. No. 9,274,237 B2, incorporated herein by reference. In particular, the $^6$Li compound may be selected from the group consisting of lithium organic salts including groups selected from the group consisting of: lithium benzoate, lithium biphenylcarboxylate, lithium salicylate, lithium phenylsalicylate, lithium alkoxybenzoic acid, analogs thereof, and combinations thereof.

The $^6$Li or $^{10}$B-containing compound may be present in an amount ranging from 0.01 wt. % to 20 wt. %, such as, for example, 0.05 to 5%, or 0.1 to 3%. The additives should be soluble in the polymeric matrix.

A process for in-situ polymerization of the plastic scintillator, incorporating silyl-fluorene based fluorophores, comprises the method set forth herein.

A matrix monomer (e.g., styrene or 4-vinyltoluene) is provided in a reaction vessel. Optionally, an anti-fog agent (as an additive or a comonomer) is dissolved in or mixed with the matrix monomer dissolved in a concentration mentioned above corresponding to the anti-fog component. Then the primary silyl-fluorene fluorophore is dissolved in a weight percentage mentioned above. Next the secondary fluorophore is added and dissolved in a weight percentage range mentioned above for secondary fluorophore.

Optionally, a co-monomer and/or cross-linker may be added and dissolved at a concentration of 0.05 to 50 wt. % or other weight percentage range mentioned above for these components. The crosslinker agents may be members of the divinyl, diacrylate or dimethacrylate classes. Examples of crosslinker agents include divinylbenzene, glycerol-1,3-diglycerolate diacrylate, poly(ethylene glycol) diacrylate (with n ethylene glycol units ranging from 1 to 20), poly(ethylene glycol) dimethacrylate (with n ethylene glycol units ranging from 1 to 20), 1,6-hexanediol dimethacrylate, 1,4-butanediol dimethacrylate, 1,4-phenylene dimethacrylate, poly(propylene glycol) dimethacrylate, bisphenol A dimethacrylate, 2,2-bis[4-(2-hydroxy-3-methacryloxypropoxy)phenyl]propane, and tricyclodecane dimethanol diacrylate.

Optionally, a radical initiator may be added and dissolved in an amount effective to initiate polymerization. The radical initiator may comprise, for example, AIBN or an organic peroxide.

Optionally, pre-treatment methods may be employed including silanization of the glass reaction vessel and/or sonication to facilitate extraction of the solid polymer puck post-reaction. Optionally, the reaction is conducted in an inert atmosphere.

In an embodiment, the reaction mixture is transferred to a heavy-walled glass reaction vessel prior to polymerization. At that point, the reaction vessel is sealed and heated to a defined polymerization temperature in an oven or using a heat transfer fluid (oil, water, etc.). Polymerization may be through a free radical or condensation reaction mechanism. The heating and cooling ramp rate is controlled for cross-linked samples to avoid potential cracking due to the buildup of hydrostatic stress.

Thermal stresses may be introduced in cross-linked materials and this should be taken into account when performing larger-scale polymerizations to avoid potential failure via fracture. This can be addressed by adjusting the heating/cooling rate, stirring/recirculation rate, polymerization temperature, polymerization vessel material, and heat-transfer medium. The polymerization should be controlled from the gelation stage through the final polymerization stage, in order to achieve the lowest residual (i.e. unreacted) monomer content, such as less than 2% by weight, 1% to 0.001% by weight, or 0.5 to 0.01% by weight. Unreacted monomer has been shown to have deleterious effects upon the physical/mechanical properties, long-term stability, and the scintillation light yield. In an embodiment, the reaction conditions involve heating at 50° C. to 200° C., such as 60 to 100° C., or 80° C. to 90° C. for 1 to 5 days, such as, 2, 3, or 4 days, followed by final curing at 90 to 150° C., such as 70° C. to 120° C., or 100 to 115° C. for 2, 3, 4, or 5 days.

Optically homogeneous physical blends of glass scintillator and preformed polymer allow for high figure-of-merit pulse shape discrimination of gamma and neutron radiation. In an embodiment, the blends are achieved by co-dissolving the polymer, primary fluorophore, and secondary fluorophore in appropriate solvent, and removing the solvent. The powder thus obtained can be used to create plastic scintillators via direct thermal processing methods, such as melt-casting into an appropriate mold, extrusion, or injection molding. In an embodiment, the scintillator material is mechanically rigid at room temperature, for example, with a Shore D hardness (ASTM D2240 00) of 15 or greater, such as 20 to 100, or 40 to 60. The scintillator material, may be dimensioned to fit various applications. Example geometries are cylindrical, cubical, or prismatic, and each of the dimensions (height, length, width, diameter) may independently range, for example, from 5 inches to 0.01 inches, 3 inches to 0.25 inches, and 2 inches to 0.5 inches. Sample masses may range up to, for example, 1 kg, or up to 300 g, such as 100 g to 200 g, or 130 g to 175 g.

In an embodiment, the scintillating material disclosed herein produces a light yield of 10,000 photons/MeVee to 30,000 photons/MeVee, such as 12,000 to 25,000, or 15,000 to 20,000 photons/MeVee with a trans-stilbene reference. MeVee (or MeV e–) refers to a unit of measure known and understood in the art and stands for, Mega-electron volt, electron equivalent. 1 MeVee corresponds to the total scintillation light produced by a 1 MeV electron. In an embodiment, the light yield is increased by 10 to 50% relative to trans-stilbene. In an embodiment, the primary scintillation lifetime of the scintillating material is 500 picoseconds to 5 nanoseconds, such as, 800 picoseconds to 3 nanoseconds, or 1 nanosecond to 2 nanoseconds. In an embodiment the scintillator material disclosed herein is capable of neutron and gamma pulse-shape discrimination, at 1 keVee to 30 MeVee. In an embodiment, scintillator material disclosed herein is capable of gamma-ray spectroscopy, at 5 keVee to 1.3 MeVee. In an embodiment, the scintillator material disclosed herein is capable of detecting thermal neutrons via pulse-shape discrimination of the neutron capture signal. Additives mentioned herein may affect these properties.

In addition, in embodiments, in addition to high scintillation light yields, the scintillation materials described herein are can be economically formed into large form-factors. For example, scintillators of sizes on the order of several cubic inches, such as 1 cubic cm to 130,000 cubic cm, such as 25 cubic cm to 5000 cubic cm, or 30 cubic cm to 200 cubic cm can be manufactured according to the procedures disclosed herein. In an embodiment, the scintillators have thicknesses of 1 micrometer to 5 meters, such as, for example, 1 centimeter to 3 meters, or 10 centimeters to 1 meter.

The scintillating materials disclosed herein may be used in applications that require high detection efficiency (large-volume) and significantly lower cost than achievable using inorganic scintillators or semiconductors. A specific example of a possible application is radiation portal monitors (RPMs) used at ports-of-entry to a country. Currently, RPMs are based on large panels (i.e. 14"×68"×3") of conventional plastic scintillators. Replacement of conventional plastic scintillators with the scintillating materials disclosed herein would improve scintillation light output, without detrimentally affecting mechanical properties, or manufacturing aspects already optimized for conventional plastic scintillators. The improvements disclosed herein may also be implemented in other scintillator applications, such as pulse shape discriminating plastics and spectroscopic plastics.

EXAMPLES

Synthesis of Examples 1-4 (silyl-fluorene fluorophores)

The synthesis for Example 1 was adapted from the method disclosed in Wei, W.; Djurovich, P. I.; Thompson, M. E. Chem. Mater. 2010, 22, 1724-1731, which is incorporated herein by reference. 2-bromo-9,9-dimethylfluorene was used as received from Oakwood Chemicals, (which can also be prepared according to a known procedure (J. Phys. Chem. Lett. 2010, 1, 616-620; incorporated herein by reference)).

A dry 500 mL round bottom flask was charged with a stir bar, 2-bromo-9,9-dimethylfluorene (14.57 g, 53.33 mmol, 2.0 equiv) and THF (89 mL) under argon. The mixture was cooled to −78° C., followed by addition of n-BuLi as 2.5 M solution in hexanes (21.33 mL, 2.0 equiv) via syringe over 10 minutes. A dark red slurry formed. The mixture was stirred for 30 minutes, followed by the addition of $Ph_2SiCl_2$ (6.75 g mL, 26.66 mmol) dropwise via syringe. The mixture was slowly warmed to 25° C. and stirred for 12 hours. $H_2O$ (80 mL) was added, and the biphasic mixture was extracted with dichloromethane (DCM) (3×50 mL). The combined organics were washed with brine (30 mL), dried with $MgSO_4$, and concentrated in vacuo. The crude product was purified via recrystallization from 1/5 DCM/Hexanes to provide 11.98 g of Example 1 as a colorless crystalline solid (79% yield) of bis(9,9'-dimethylfluoren-2-yl)diphenylsilane.

Fluorophores P3 (Example 2), octyl-P3 (Example 3), and P4 (Example 4) were synthesized analogously (see Reaction Scheme 1 below)

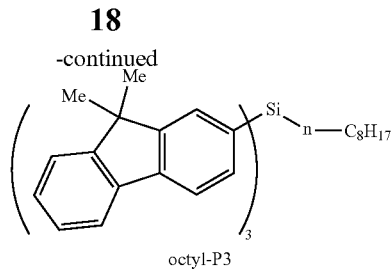

octyl-P3

Example 5 and 6: Synthesis of Secondary Fluorophores

Non-commercial secondary fluorophores were synthesized. Example 5, 2-(4-(9,9-dimethyl-9H-fluoren-2-yl)phenyl)-5-phenyl-1,3,4-oxadiazole (DMF-PPD) was synthesized according to a known procedure: Fang Y-K, Liu C-L, Chen W-C. Journal of Materials Chemistry. 2011 (21) 4778-86, which is incorporated herein by reference.

Example 6, 1,4-bis(9,9-dimethyl-9H-fluoren-2-yl)benzene (1,4-bisTMBFB), was prepared as follows:
To an oven-dried Schlenk flask under argon was added 9,9'-dimethylfluoren-2-yl boronic acid (0.524 g, 2.2 mmol; prepared according to a known procedure: Huang H-F, Xu S-H, He Y-B, Zhu C-C, Fan H-L, Zhou X-H, Gao X-C, Dai Y-F. Dyes and Pigments 2013; (96) 705-713, which is incorporated herein by reference), 1,4-dibromobenzene (0.236 g, 1 mmol), cesium carbonate (0.978 g, 3 mmol), Pd Xphos Generation II Precatalyst (0.079 g, 0.1 mmol). The flask was sealed, and subjected to three pump-purge cycles with argon. Degassed THF (10 mL) and deionized water (2 mL) was added to the flask via syringe. The flask contents were thoroughly mixed and heated to 65° C. overnight. A white precipitate was observed which was qualitatively insoluble in dichloromethane and ethyl acetate. The reaction was cooled, and the precipitate filtered in vacuo, and rinsed with dichloromethane. 123 mg of a crystalline white solid was collected (27%). The $^1H$ NMR spectrum for the isolated compound agreed with prediction.

Scheme 1

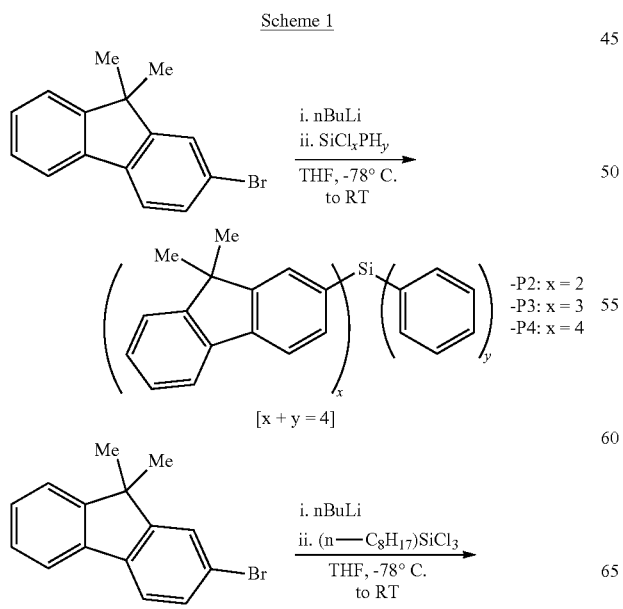

Scheme 2

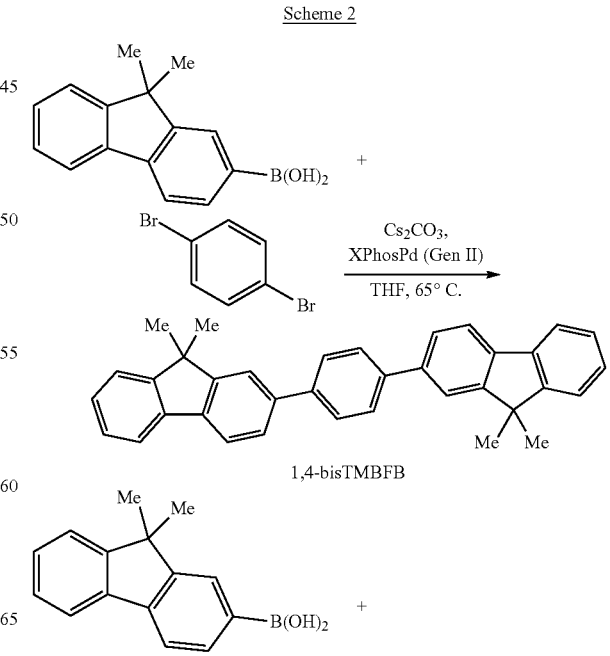

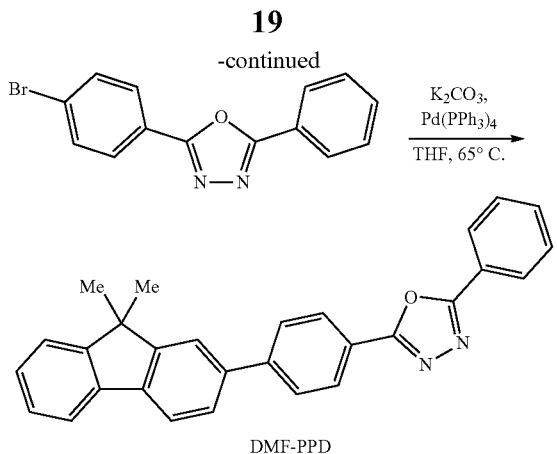

DMF-PPD

Examples 7-31: Plastic Scintillators Containing Silyl Primary Fluorophore Prepared Via In-Situ Polymerization Examples 7-31 that included a silyl-primary fluorophore were synthesized by the procedure for in-situ polymerization. Components of the examples were added in the amounts shown in Table 1. All reagents used in plastic scintillator synthesis were either purchased from SIGMA-ALDRICH, used as received, purified as detailed, or synthesized in-house as explained. All liquid vinyl monomers were purified neat by vacuum filtration over a 2.5" diameter, 3" tall plug of basic alumina to remove inhibitor, followed by degassing with nitrogen gas to remove dissolved oxygen. 1,4-bis(2-methylstyryl)benzene (bis-MSB) and 1,4-bis(5-phenyloxazol-2-yl)benzene (POPOP) were used as received from commercial sources. All measuring operations and polymerization reactions were conducted under inert atmosphere.

Example 7 was synthesized as follows. To a dry 8 mL glass vial in an argon-atmosphere glovebox was added Example 1 (200 mg, 10% wt.) and POPOP (2 mg, 0.01 wt. %). Then de-inhibited, de-gassed vinyltoluene (1798 mg, 80. % wt.) was added. The vial was sealed, and the mixture heated at 60° C. for 10 minutes and shaken to facilitate dissolution of the fluorophores. The reaction vial was then heated in an aluminum reaction block for 3 days at 80° C., followed by 4 days at 115° C. After the reaction period, the reaction vial was cooled to room temperature, the hardened polymer monolith was percussively extracted, and scintillation measurements were performed.

Examples 8-31 were synthesized using the same procedure as Example 7, with different polymer, primary fluorophore, secondary fluorophore, and additive identities and amounts. In Examples 9, 11, and 25-31, an additive was dissolved in or mixed with the matrix monomer.

TABLE 1

| Example | Polymer | Primary Fluorophore | Mass % Primary Fluorophore | Secondary Fluorophore | Mass % Secondary Fluorophore | Other additives | Scintillation Light Yield (% of EJ-200) |
|---|---|---|---|---|---|---|---|
| 7 | PVTMI | Ex .1 | 10 | POPOP | 0.1 | | 117.9 |
| 8 | PVTMI | Ex .1 | 10 | POPOP | 0.2 | | 121.1 |
| 9 | PVTMI | Ex .1 | 20 | POPOP | 0.2 | Triton X-114, 2.5 wt. % | 136.3 |
| 10 | PVTMI | Ex .1 | 20 | POPOP | 0.2 | | 134 |
| 11 | PVTMI | Ex .1 | 9 | POPOP | 0.2 | 1 % Ex. 2 by mass | 125.2 |
| 12 | PVTMI | Ex. 2 | 10 | POPOP | 0.2 | | 122 |
| 13 | PVTMI | Ex. 4 | 10 | POPOP | 0.2 | | 119.7 |
| 14 | PVTMI | Ex. 3 | 10 | POPOP | 0.2 | | 111.4 |
| 15 | PS | Ex .1 | 10 | POPOP | 0.2 | | 113.8 |
| 16 | P4-VT | Ex .1 | 10 | POPOP | 0.2 | | 120.1 |
| 17 | 2,4-PDMS | Ex .1 | 10 | POPOP | 0.2 | | 94.5 |
| 18 | 1:1 (w/w) PDMS: PVTMI | Ex .1 | 10 | POPOP | 0.2 | | 111.8 |
| 19 | 1:3 (w/w) PDMS: PVTMI | Ex .1 | 10 | POPOP | 0.2 | | 118.1 |
| 20 | PVTMI | Ex .1 | 10 | POPOP | 0.3 | | 122 |
| 21 | PVTMI | Ex .1 | 10 | bisMSB | 0.2 | | 118.1 |
| 22 | PVTMI | Ex .1 | 10 | DPA | 0.2 | | 116.9 |
| 23 | PVTMI | Ex .1 | 10 | 1,4-bisTMBFB | 0.2 | | 136.2 |
| 24 | PVTMI | Ex .1 | 10 | 2-(DMF)-PPD | 0.2 | | 124 |
| 25 | PVTMI | Ex .1 | 10 | [none] | 0 | 0.25 % benzophenone | 6.7 |
| 26 | PVTMI | Ex .1 | 10 | [none] | 0 | 0.5 % benzophenone | <5 % |
| 27 | PVTMI | Ex .1 | 10 | [none] | 0 | 1 % benzophenone | <5 % |
| 28 | PVTMI | Ex .1 | 10 | [none] | 0 | 2 % benzophenone | <5 % |
| 29 | PVTMI | Ex .1 | 10 | POPOP | 0.2 | trimethylethyltin additive 8.1 % (5 % Sn) | 117.7 |
| 30 | PVTMI | Ex .1 | 10 | POPOP | 0.2 | trimethylethyltin 16.3 % (10 % Sn) | 107.9 |

TABLE 1-continued

| Example | Polymer | Primary Fluorophore | Mass % Primary Fluorophore | Secondary Fluorophore | Mass % Secondary Fluorophore | Other additives | Scintillation Light Yield (% of EJ-200) |
|---|---|---|---|---|---|---|---|
| 31 | PVTMI | Ex .1 | 10 | POPOP | 0.2 | dimethyldiethyltin 8.8 % (5 % Sn) | 115.7 |

*PVTMI is polyvinyltoluene, mixed isomers (nominally 60% meta, 40% para)
*PS is poly(styrene)
*P4-VT is poly(4-vinyltoluene)
*PDMS is poly(2,4-dimethylstyrene)

Examples 32-37: Plastic Scintillators Prepared Via Physical Blending of Silyl Fluorophore and Preformed Polymer The procedure for casting of Example 32 was as follows. Polystyrene (1 gram, 35k Da, used as received from Sigma Aldrich) was dissolved in minimal dichloromethane (3-5 mL). Under a steady stream of nitrogen, Example 1 was added (9 grams) along with POPOP (0.020 gram), and the mixture was heated from 20° C. to 200° C. over 30 minutes, and held at 200° C. for 30 minutes. The mixture was cast into a mold and allowed to cool. The colorless transparent solid can be used as-is for scintillation measurements. Examples 33-36 were prepared using the procedure for Example 32 with different amounts of Example 1 and poly(styrene). Example 37 was prepared using polycarbonate (1 gram, 45k Da, used as-is from Sigma Aldrich), and Example 1 (1 gram), using the same procedure as for Example 32.

The physical blend of the Example 1 compound and vinylaromatic polymer is compatible with known thermal processing methods, such as extrusion and injection molding.

TABLE 2

Scintillation Data for physically-blended polystyrene and silicon fluorophore samples

| Example | Primary Fluorophore (Ex. 1) (% wt.) † | Polystyrene (% wt.) | $^{137}$Cs Light Yield (relative to Stilbene) | PSD - FOM |
|---|---|---|---|---|
| 32 | 90. | 10. | 134% | 3.3 |
| 33 | 80. | 20. | 130% | 3.3 |
| 34 | 70. | 30. | 125% | 2.7 |
| 35 | 60. | 40. | 115% | 2.4 |
| 36 | 50. | 50. | 113% | 3.1 |

† Examples 32-36 contained 0.05% w/w bis-MSB

TABLE 3

Blended polycarbonate and glass samples

| Example | Primary Fluorophore (Ex. 1) (% wt.) † | Polycarbonate (% wt.) † | $^{137}$Cs Light Yield (relative to Stilbene) | PSD - FOM |
|---|---|---|---|---|
| 37 | 50. | 50. | 73% | 2.2 |

† Example 37 contained 0.025% w/w bis-MSB

Example 33: Hydrothermal Aging Studies of Plastic Scintillators Containing Silyl Fluorophores Effects of hydrothermal aging on Examples 9 and 10 above were assessed by comparing optical images before and after an aging period of 21 days at 55° C., and 100% relative humidity, which was sufficient to saturate the plastic with moisture and accelerate any aging effects to be observed. After the aging period, the samples were removed from the aging environment and cooled to room temperature at 1° C./minute, whereupon their scintillation response was characterized. Then, the samples were cooled to −20° C. and re-analyzed for optical transparency with optical photography.

The results show effective improvement in environmental resistance over standard formulations and comparable formulations with other fluorophores. The FIGURE shows aging resistance of PVT plastic scintillators, containing Example 1 and Triton X, shown before and after a complete aging cycle, as compared to PPO-loaded plastics and Eljen Technology's EJ-200.

EJ-200 fogs at 20° C. after saturation at 55° C., 100% R.H., while Example 9 does not fog, and only shows a minor hazing effect due to incomplete resin mixing. Additionally, Example 10 does not exhibit significant crystallization under these conditions, relative to samples loaded with an equivalent mass of PPO, a primary fluorophore commonly used in plastic scintillators. The scintillation light output of Example 9 is 97% of Example 10, post-aging, demonstrating the minimal effect of added anti-fog agent on scintillation.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim. The term "consisting essentially" as used herein means the specified materials or steps and those that do not materially affect the basic and novel characteristics of the material or method. All percentages and averages are by weight unless the context indicates otherwise. If not specified above, the properties mentioned herein may be determined by applicable ASTM standards, or if an ASTM standard does not exist for the property, the most commonly used standard known by those of skill in the art may be used. The articles "a," "an," and "the," should be interpreted to mean "one or more" unless the context indicates the contrary.

It is claimed:

1. A plastic scintillator comprising:
a polymeric matrix;
a primary fluorophore;
wherein the primary fluorophore is capable of generating luminescence in the presence of ionizing radiation and is capable of forming an amorphous glass in its pure form, and includes:
a central species including silicon;
a luminescent organic group bonded to the central species or to an optional organic linker group, the luminescent organic group including a polycyclic aliphatic or polycyclic aromatic group or analogs thereof;
the optional organic linker group, if present, is bonded to the central species and the luminescent organic group;
wherein the luminescent organic group includes a polycyclic aromatic group that is a fluorene or an analog thereof.

2. The plastic scintillator of claim 1, wherein the polymeric matrix is selected from one or more polymers from the following group: a vinylaromatic polymer, and a polymer containing one or more carbonate groups.

3. The plastic scintillator of claim 1, wherein the primary fluorophore is selected from the group consisting of one or more silyl-fluorene based molecules functionalized one or more times at one or more of the 2-, 7-, or 9-positions of the fluorene group.

4. The plastic scintillator of claim 3, wherein the silyl group is attached to the 2-position of the fluorene group and other functional groups, if present, are selected from the group consisting of: aliphatic alkanes or alkenes, aromatic hydrocarbons, methoxy, hydroxy, amine, alkylamine, phenylamine, or analogs thereof, wherein alkyl chains in any of the functional groups have 1 to 20 carbon atoms.

5. A plastic scintillator comprising:
a polymeric matrix;
a primary fluorophore;
wherein the primary fluorophore is capable of generating luminescence in the presence of ionizing radiation and is capable of forming an amorphous glass in its pure form, and includes:
a central species including silicon;
a luminescent organic group bonded to the central species or to an optional organic linker group, the luminescent organic group including a polycyclic aliphatic or polycyclic aromatic group or analogs thereof;
the optional organic linker group, if present, is bonded to the central species and the luminescent organic group;
the plastic scintillator further comprising an anti-fog agent, wherein the anti-fog agent is a chemical species that includes:
a cyclic central group, which can be aromatic, hetero-aromatic, aliphatic or hetero-aliphatic;
an oxygen-containing functional group; and
optionally, a linking group selected from the group consisting of: a $C_1$ to $C_{20}$ alkyl group, an ethylene glycol group, or polyethylene glycol group;
wherein if the optional linking group is not present, the cyclic central group is bonded directly to the oxygen-containing functional group; and if the optional linking group is present, the cyclic central group is bonded to the optional linking group, and the oxygen-containing functional group is also bonded to the optional linking group.

6. The plastic scintillator of claim 1, wherein the plastic scintillator includes the primary fluorophore in a range of 0.5% to 50% by weight of the total composition.

7. The plastic scintillator of claim 1, wherein the plastic scintillator includes the primary fluorophore in a range of 50% to 99% by weight of the total composition.

8. The plastic scintillator of claim 1, wherein the plastic scintillator produces a light yield of 10,000 photons/MeVee to 30,000 photons/MeVee with a trans-stilbene reference.

9. The plastic scintillator of claim 1, further comprising a wavelength shifter selected from the group consisting of: 1,4-bis(5-phenyl-2-oxazolyl)benzene (POPOP), 2,5-Bis(5-tert-butyl-benzoxazol-2-yl)thiophene (BBOT), 1,4-bis(9,9'-dialkylfluoren-2-yl) benzene, or 4,4'-(9,9-dialkylfluoren-2-yl)biphenyl, 1,4-bis(2-methylstyrl)benzene (bis-MSB), 9,10-diphenylanthracene, 2-(1-naphthyl)-5-phenyloxazole (NPO), or pi-conjugated fluorene-based fluorophores comprising 2-bifluorene, 4,4'-bis(2,2'-diphenylvinyl)-1,1'-biphenyl (DPVBi) and 9,10-diphenylanthracene (DPA) derivatives of these, or combinations of these.

10. The plastic scintillator of claim 1, further comprising a $^{10}$B-containing or an $^6$Li containing compound including a group selected from the group consisting of: carborane, boronic acid, boronic ester, boronic pinacol ester, borane, a lithium salt of an aliphatic or aromatic acid, lithium benzoate, or Li-oxazolecarboxylate, lithium benzoate, lithium biphenylcarboxylate, lithium salicylate, lithium phenylsalicylate, lithium alkoxybenzoic acid, or analogs thereof.

11. The plastic scintillator of claim 1, further comprising an organometallic compound selected from the group of: metalloalkyl compounds, alkylmetallomethacrylates, alkylmetalloacrylates, metallomethacrylates, alkylmetallostyrenes, metalloacrylates, and metallostyrenes.

12. The plastic scintillator of claim 1, wherein the plastic scintillator has a thickness of 1 micrometer to 5 meters.

13. The plastic scintillator of claim 1, wherein the primary scintillation lifetime is between 500 picoseconds and 5 nanoseconds.

14. The plastic scintillator of claim 1, wherein the plastic scintillator is capable of neutron and gamma pulse-shape discrimination at 1 keVee to 30 MeVee.

15. The plastic scintillator of claim 1, wherein the plastic scintillator is capable of gamma-ray spectroscopy at 5 keVee to 1.3 MeVee.

16. A method of making a plastic scintillator comprising the steps of either (a) or (b):
(a) dissolving a primary fluorophore in a monomer;
then in-situ polymerizing the monomer via a radical addition mechanism or a condensation reaction; or
(b) blending a polymer and a primary fluorophore with one or more of mechanical mixing, heating, or co-dissolution in a solvent to form a blended material; and
thermally processing the plastic scintillator into a desired shape;
wherein the primary fluorophore is capable of generating luminescence in the presence of ionizing radiation and is capable of forming an amorphous glass in its pure form, and includes:
a central species including silicon;
a luminescent organic group bonded to the central species or to an optional organic linker group, the luminescent organic group including a polycyclic aliphatic or polycyclic aromatic group or analog thereof;
the optional organic linker group, if present, is bonded to the central species and the luminescent organic group;

wherein the luminescent organic group includes fluorene or an analog thereof.

17. The method of claim 16, wherein the plastic scintillator further comprises an anti-fog agent, wherein the anti-fog agent is a chemical species that includes:
- a cyclic central group, which can be aromatic, hetero-aromatic, aliphatic or hetero-aliphatic;
- an oxygen-containing functional group; and
- optionally, a linking group selected from the group consisting of: a $C_1$ to $C_{20}$ alkyl group, an ethylene glycol group, or polyethylene glycol group;

wherein if the optional linking group is not present, the cyclic central group is bonded directly to the oxygen-containing functional group; and if the optional linking group is present, the cyclic central group is bonded to the optional linking group, and the oxygen-containing functional group is also bonded to the optional linking group.

18. The method of claim 16, wherein the following steps are conducted: (a) dissolving the primary fluorophore in the monomer;
then in-situ polymerizing the monomer via the radical addition mechanism or the condensation reaction.

19. The method of claim 16, wherein the following steps are conducted:
(b) blending the polymer and the primary fluorophore with one or more of mechanical mixing, heating, or co-dissolution in a solvent to form a blended material; and thermally processing the plastic scintillator into a desired shape.

20. The plastic scintillator of claim 1, further comprising an anti-fog agent, wherein the anti-fog agent is a chemical species that includes:
- a cyclic central group, which can be aromatic, hetero-aromatic, aliphatic or hetero-aliphatic;
- an oxygen-containing functional group; and
- optionally, a linking group selected from the group consisting of: a $C_1$ to $C_{20}$ alkyl group, an ethylene glycol group, or polyethylene glycol group;

wherein if the optional linking group is not present, the cyclic central group is bonded directly to the oxygen-containing functional group; and if the optional linking group is present, the cyclic central group is bonded to the optional linking group, and the oxygen-containing functional group is also bonded to the optional linking group.

* * * * *